United States Patent
Miller et al.

(10) Patent No.: US 10,472,279 B1
(45) Date of Patent: Nov. 12, 2019

(54) PORTLAND CEMENT-BASED COMPOSITION WITH IMPROVED PIGMENT DISPERSION AND COLOR CONSISTENCY

(71) Applicant: H.B. Fuller Construction Products Inc., St. Paul, MN (US)

(72) Inventors: Bronwyn T. Miller, Belvidere, IL (US); Martyn J. Guimon, Glen Ellyn, IL (US); Gregory W. Schad, Cary, IL (US)

(73) Assignee: H.B. Fuller Company, St. Paul, MN (US)

( * ) Notice: Subject to any disclaimer, the term of this patent is extended or adjusted under 35 U.S.C. 154(b) by 791 days.

(21) Appl. No.: 14/608,773

(22) Filed: Jan. 29, 2015

(51) Int. Cl.
*C04B 7/02* (2006.01)

(52) U.S. Cl.
CPC ...................... *C04B 7/02* (2013.01)

(58) Field of Classification Search
CPC ....................................................... C04B 7/02
See application file for complete search history.

(56) References Cited

U.S. PATENT DOCUMENTS

| | | | |
|---|---|---|---|
| 4,403,866 A * | 9/1983 | Falcoff | B01F 13/1055 366/132 |
| 5,192,366 A | 3/1993 | Nishioka et al. | |
| 5,362,322 A * | 11/1994 | Johansen, Jr. | C04B 26/14 106/482 |
| 5,558,708 A | 9/1996 | Johansen, Jr. et al. | |
| 5,650,004 A * | 7/1997 | Yon | C04B 20/1051 106/719 |
| 5,746,822 A | 5/1998 | Espinoza et al. | |
| 5,846,315 A * | 12/1998 | Johansen, Jr. | B28C 7/12 106/401 |
| 5,855,665 A | 1/1999 | Johansen, Jr. et al. | |
| 5,951,752 A | 9/1999 | Johansen, Jr. et al. | |
| 6,106,608 A * | 8/2000 | Andree | C04B 40/0039 106/695 |
| 6,692,565 B2 * | 2/2004 | Johansen, Jr. | C04B 20/10 106/712 |
| 6,923,857 B2 | 8/2005 | Constantinou et al. | |
| 7,497,904 B2 | 3/2009 | Dulzer et al. | |
| 2008/0171812 A1 | 7/2008 | Zhang et al. | |

FOREIGN PATENT DOCUMENTS

| | | |
|---|---|---|
| CN | 103641390 | 3/2014 |
| CN | 103755291 | 4/2014 |
| IN | 167634 | * 11/1990 |
| JP | H01320244 | 12/1989 |
| JP | H0328151 | 2/1991 |
| WO | WO 03/042126 | 5/2003 |

OTHER PUBLICATIONS

CN 103641390 (Mar. 19, 2014) Xu abstract only.*
CN 103641390 A (Mar. 19, 2014) Xu Machine Translation into English.*

* cited by examiner

*Primary Examiner* — Shuangyi Abu Ali
(74) *Attorney, Agent, or Firm* — Kirsten Stone; Allison Johnson

(57) ABSTRACT

A tintable cement-based composition that includes a cement-based powder component and a pigment component. The powder component includes Portland cement, a filler, calcium sulfate hemihydrate, aluminum oxide, and Sepiolite clay; and the pigment component includes at least one pigment. The components can be packaged separately and mixed with water at the point of use.

27 Claims, No Drawings

PORTLAND CEMENT-BASED COMPOSITION WITH IMPROVED PIGMENT DISPERSION AND COLOR CONSISTENCY

FIELD OF THE INVENTION

The invention relates to a tintable cement-based composition useful as a joint filler for filling joints in a tiled surface.

BACKGROUND OF THE INVENTION

After setting tiles on a surface, the joints between the tiles are filled with a joint filler. For decorative reasons, it is desirable to color the joints. Tinted cement-based tile grouts as joint filler have been gaining popularity because they provide unique and distinctive appearances.

Portland cement-based tile grout is a cost effective way to fill the spaces between tiles. Tile grouts are typically composed of Portland cement, sand, calcium carbonate and iron oxide and often, small amounts of spray-dried polymer and cellulose. The dry ingredients are blended, packaged and then mixed with water at the job site. The grout is installed and once cured, forms a hard, durable pigmented joint filler.

Portland cement-based tile grouts, however, have some disadvantages, particularly the lack of color consistency. Among reasons for the poor color consistency, efflorescence is a common issue with Portland cement, due to the lime that is produced during the cement hydration reaction and also common mineral impurities of sodium or potassium. Primary efflorescence typically occurs during the initial cure of the cement-based grout. Excess water is driven out as a result of the heat of hydration as the cement cures, bringing salts to the surface. As the water evaporates, it leaves the salt behind, forming a white deposit known as efflorescence. Secondary efflorescence can also form after the cement has cured, upon exposure to water.

Further, the degree of color inconsistency in a Portland cement-based tile grout can be affected by many factors. The amount of water used in the mix and the temperature and humidity conditions can affect the cement cure and contribute to increased efflorescence. The amount of water used in the grout clean up and the clean up procedure itself can also lead to increased efflorescence.

SUMMARY OF THE INVENTION

In one aspect, the invention features a cement-based composition that includes a cement-based powder component that includes Portland cement, a filler, calcium sulfate hemihydrate, aluminum oxide, and Sepiolite clay, and a pigment component that includes at least one pigment, the cement-based composition exhibiting color tolerance values of DL=0+/−3.0, Da=0+/−1.5, and Db=0+/−1.5 when tested according to at least one of Water Content Test Method I and Water Soak Test Method I. In one embodiment, the composition exhibits color tolerance values of DL=0+/−3.0, Da=0+/−1.5, and Db=0+/−1.5 when tested according to the Water Content Test Method I. In other embodiments, the composition exhibits color tolerance values of DL=0+/−3.0, Da=0+/−1.5, and Db=0+/−1.5 when tested according to the Water Soak Test Method I.

In some embodiments, the cement-based powder component comprises from about 15% by weight to about 50% by weight Portland cement. In other embodiments, the cement-based powder component comprises from about 30% by weight to about 70% by weight filler. In another embodiment, the cement-based powder component comprises from about 0.1% by weight to about 10% by weight calcium sulfate hemi-hydrate. In other embodiments, the cement-based powder component includes from about 0.1% by weight to about 5% by weight aluminum oxide. In another embodiment, the cement-based powder component includes from about 0.05% by weight to about 3% by weight Sepiolite clay.

In some embodiments, the filler is selected from the group consisting of silica sand, calcium carbonate, and combination thereof.

In one embodiment, the pigment component includes a mixture of at least two different pigments.

In one embodiment, the cement-based product is a tile grout.

In another aspect, the invention features a tintable cement-based powder that includes Portland cement, filler, calcium sulfate hemi-hydrate, aluminum oxide, and Sepiolite clay. In one embodiment, the tintable cement-based powder includes from about 0.1% by weight to about 10% by weight calcium sulfate hemi-hydrate, from about 0.1% by weight to about 5% by weight aluminum oxide, and from 0.05% by weight to about 3% by weight Sepiolite clay. In another embodiment, the tintable cement-based powder includes from about 0.1% by weight to about 5% by weight calcium sulfate hemi-hydrate, from about 0.1% by weight to about 3% by weight aluminum oxide, and from 0.05% by weight to about 2% by weight Sepiolite clay. In other embodiments, the tintable cement-based powder includes from 0.5% by weight to about 2.5% by weight calcium sulfate hemi-hydrate, from 0.3% by weight to about 2% by weight aluminum oxide, and from 0.1% by weight to about 1% by weight Sepiolite clay.

In some embodiments, the tintable cement-based powder exhibits color tolerance values of DL=0+/−3.0, Da=0+/−1.5, and Db=0+/−1.5 when tested according to Water Soak Test Method II. In other embodiments, the tintable cement-based powder exhibits color tolerance values of DL=0+/−3.0, Da=0+/−1.5, and Db=0+/−1.5 when tested according to Water Content Test Method II. In another embodiment, the tintable cement-based powder exhibits color tolerance values of DL=0+/−3.0, Da=0+/−1.5, and Db=0+/−1.5 when tested according to Water Absorption Test Method II. In one embodiment, the tintable cement-based powder exhibits color tolerance values of DL=0+/−3.0, Da=0+/−1.5, and Db=0+/−1.5 when tested according to Water Droplet Test Method II. In other embodiments, the tintable cement-based powder exhibits color tolerance values of DL=0+/−3.0, Da=0+/−1.5, and Db=0+/−1.5 when tested according to Water Droplet Test Method II, Water Content Test Method II, and Water Soak Test Method II. In another embodiment, the tintable cement-based powder exhibits color tolerance values of DL=0+/−3.0, Da=0+/−1.5, and Db=0+/−1.5 when tested according to Water Content Test Method II and Water Soak Test Method II. In some embodiments, the filler is selected from the group consisting of silica sand, calcium carbonate, and combinations thereof.

In another aspect, the invention features a tinted cement-based composition that includes a tintable cement-based powder disclosed herein and from 0.1% by weight to no greater than 10% by weight pigment. In one embodiment, the pigment includes a mixture of at least two pigments. In some embodiments, tintable cement-based powder is a tintable cement-based grout.

In other aspects, the invention features a pigment composition that includes pigment, calcium sulfate hemi-hydrate, aluminum oxide, and Sepiolite clay. In one embodiment, the pigment composition includes from about 6% by weight to about 20% by weight pigment, from about 50% by weight to about 75% by weight calcium sulfate hemi-hydrate, from about 15% by weight to about 30% by weight aluminum oxide, and from about 4% by weight to about 15% by weight Sepiolite clay. In other embodiments, the pigment composition includes from about 6% by weight to about 16% by weight pigment, from about 55% by weight to about 70% by weight calcium sulfate hemi-hydrate, from about 17% by weight to about 25% by weight aluminum oxide, and from about 5% by weight to about 12% by weight Sepiolite clay.

In another aspect, the invention features a method of grouting a tile joint, the method including combining a cement-based composition disclosed herein and water to produce a tinted grout paste, applying the tinted grout paste to the joint, and allowing the tinted grout paste to cure. In one embodiment, the combining includes combing the tintable cement-based composition with from about 15% by weight to about 30% by weight water based on the weight of the powder.

In one embodiment, the method includes mixing a tintable cement-based powder with a pigment and water to produce a tinted grout paste, applying the tinted grout paste to a joint, and allowing the tinted grout to cure. In one embodiment, the combining includes combing the tintable cement-based powder with from about 15% by weight to about 30% by weight water based on the weight of the powder.

In other aspects, the invention features a kit for providing a tinted grout, the kit including a cement-based composition disclosed herein, and instructions for mixing the powder component, pigment, and water to provide a tinted grout.

In another aspect, the invention features a cement-based composition that includes Portland cement and exhibits color tolerance values of DL=0+/−3.0, Da=0+/−1.5, and Db=0+/−1.5 when tested according to at least one of Water Content Test Method I and Water Soak Test Method I.

The tintable cement-based composition is formulated to be capable of providing a more color consistent finished grout, utilizing an inexpensive Portland cement. The tintable cement-based composition provides improved pigment dispersion and color consistency; increased color for a given amount of pigment, therefore, reducing the amount of the pigment required; consistent color under conditions of varying water loss (e.g., absorptive versus porcelain tiles); and less tendency to effloresce.

The tintable cement-based composition can be packaged and sold as a "tintable" product, with the pigment(s) (e.g., iron oxide pigment(s)) being packaged and sold in a separate unit. The advantage for the retailer is that only one grout base must be stocked, while the small pigment units take up less space. Conventional cement grouts are not typically sold in this manner; normally a pigment is incorporated into the grout powder.

If pigment is not well dispersed, pigment streaks may be seen in the grout paste. Unlike the conventional cement grouts, separately packaged pigment(s) will disperse well enough when added to and mixed with the separately packaged cement-based powder component at the point of use.

The tintable cement-based composition can be uniformly tinted not only to the naked eye, but also when measured using a SPECTRAFLASH 600 Plus (Datacolor International) spectrophotometer. More particularly, the tintable cement-based composition can be used to form a tinted grout that exhibits a change in color tolerance values of DL= 0+/−3.0, Da=0+/−1.5, and Db=0+/−1.5 when exposed to at least one environmental factor as determined relative to the color tolerance values for a standard.

GLOSSARY

Unless noted otherwise, the following terms and/or phrases, as used herein, have the following meanings.

The term "tile" refers to various tiles including ceramic tiles, porcelain tiles, quarry tiles, glass tiles as well as other masonry products such as stone, bricks, pavers, and the like.

The term "tintable" is meant to indicate the capability of being uniformly tinted using at least one pigment.

DETAILED DESCRIPTION OF THE INVENTION

The tintable cement-based composition includes a cement-based powder component. The cement-based powder component and a pigment component can be packaged together or separately and mixed together with water to produce a tinted grout paste at a job site, which can be used in any application where cement-based compositions have typically been used such as for grouting. The pre-packaged amounts of the cement-based powder component and the pigment component can eliminate the need for measuring equipment to be used on the job site and enable the user to obtain a consistent color throughout the job even if additional batches need to be made.

The tintable cement-based composition exhibits color tolerance values of DL=0+/−3.0, Da=0+/−1.5, and Db=0+/−1.5 when tested according to at least one of the Water Soak Test Method II, the Water Content Test Method II, the Water Absorption Test Method II, the Water Droplet Test Method II, and the Humidity Test Method II.

The cement-based powder component includes a Portland cement. The Portland cement is preferably Type I Portland cement but other types of Portland cement may also be used, and mixtures of different types of Portland cement may be used. Preferably, the cement-based powder component includes either white Portland cement or gray Portland cement. Examples of commercially available Portland cement include Portland cement Type I white from Federal White Cement Woodstock, (Ontario, Canada). Portland cement is present in an amount of from about 15% by weight to about 50% by weight, from about 20% by weight to about 40% by weight, or even from about 25% by weight to about 35% by weight based on the weight of the cement-based powder component.

The cement-based powder component also includes calcium sulfate hemi-hydrate. Calcium sulfate hemi-hydrate is also known as plaster of Paris. Examples of commercially available calcium sulfate hemi-hydrate include White Moulding Plaster from United States Gypsum Company (Chicago, Ill.). The cement-based powder component includes at least about 0.1% by weight, at least about 0.5% by weight, from about 0.1% by weight to about 10% by weight, from about 0.1% by weight to about 5% by weight, or even from about 0.5% by weight to about 2.5% by weight calcium sulfate hemi-hydrate.

The cement-based powder component also includes aluminum oxide. Examples of suitable commercially available aluminum oxides include AXILAT SA 502 from Momentive Specialty Chemicals Inc. (Roebuck, S.C.). The cement-based powder component includes at least about 0.1% by weight, from about 0.1% by weight to about 5% by weight, from about 0.1% by weight to about 3% by weight, or even from about 0.3% by weight to about 2% by weight aluminum oxide.

The cement-based powder component also includes a Sepiolite clay. Examples of suitable commercially available Sepiolite clays include PANGEL S9 from TOLSA Group (Madrid, Spain). The cement-based powder component includes at least about 0.05% by weight, from about 0.05% by weight to about 3% by weight, from about 0.05% by weight to about 2% by weight, from about 0.1% by weight to about 3% by weight, or even from about 0.1% by weight to about 1% by weight Sepiolite clay.

The cement-based powder component may include a variety of additives including, e.g., fillers, cellulose, redispersible polymer powders (e.g., spray-dried polymer), defoamers, antimicrobial and/or anti-fungal additives, surfactants, and combinations thereof. The additives can be added as a separate component into the cement-based composition, but it is preferred that the fillers be premixed and prepackaged with the cement-based powder component to insure consistent color reproduction.

Suitable fillers include, e.g., silica sand, calcium carbonate, and combination thereof. When silica sand, calcium carbonate, and combinations thereof are present, the cement-based powder component includes at least about 30% by weight, from about 30% by weight to about 70% by weight of these fillers.

Additional useful fillers include, e.g., limestone, perlite, volcanic aggregate, ground quartz, volcanic ash, talc, mica, clays other than Sepiolite clay, marble dust various gravel, various light weight fillers such as hollow ceramic spheres, hollow plastic spheres, glass beads, expanded plastic beads, diatomaceous earth, vermiculite, and combinations thereof. The cement-based powder component can include from about 5% by weight to about 10% by weight, to about 25% by weight, or even to about 50% by weight of these additional fillers.

Pigment can be combined with the tintable cement-based powder component to form a tinted cement-based composition. The pigment component includes at least one pigment, or even at least two different pigments. The pigment preferably is dry or in the form of a powder. Useful pigments can be any suitable pigments. Examples of inorganic pigments include such as a variety of iron oxide pigments commercially available from NUBIOLA Inc. (Norcross, Ga.), titanium dioxide, zinc oxide, carbon black, natural burnt umber, ultra marine blue, bismuth vanadates, raw and burnt sienna and umber, cadmium pigments, chromium pigments, and combinations thereof. Examples of organic pigments include phthalocyanines, quinacridones, quinophthalones, anthraquinones, isoindolines, pyranthrones, indanthrones, and derivatives of dioxazine, diketopyrrolopyrroles, azo-compounds, and combinations thereof.

Liquid pigments may also be used in the present invention. If a liquid pigment is used it preferably is capable of being dispersed in water, solvent-free, unaffected by temperature ranging from 250° F. to 850° F. and stable in alkaline solutions.

Pigment can be combined with the tintable cement-based powder component in an amount of from 0% by weight to no greater than about 10% by weight, no greater than about 5% by weight, from 0% by weight to about 5% by weight, from 0.1% by weight to about 5% by weight, or about 5% by weight pigment, or even from about 0.1% by weight to about 4% by weight, or about 5% by weight pigment, based on the weight of the cement-based composition.

The tinted cement-based composition preferably exhibits color tolerance values of DL=0+/−3.0, Da=0+/−1.5, and Db=0+/−1.5 when tested according to at least one of the Water Soak Test Method I, the Water Content Test Method I, the Water Absorption Test Method I, the Water Droplet Test Method I, and the Humidity Test Method I.

The tintable cement-based composition can be prepared according to any known mixing methods, and the particular methodology employed is not critical. For example, the desired ingredients of the cement-based powder component may simply be placed in an appropriate container in appropriate amounts and mixed until a substantially uniform dry powder mixture is achieved.

A prepackaged pigment or mixture of pigments can then dispersed in the cement-based powder mixture by the action of a mechanical mixer (e.g., a drill and paddle mixer). Separately added pigment(s) will disperse well in the cement-based powder mixture, thus, no pigment streaks would be seen in the grout paste.

In some embodiments, the tintable cement-based composition is prepackaged with predetermined amounts of all the ingredients required for a particular cement-based product such as a grout. The package used for the tintable cement-based composition can include instructions for mixing the cement-based powder component and a pigment (or a pigment component) with water to provide the tinted grout.

The tintable cement-based composition, upon mixing with a prepackaged pigment component and water at the point of use, can be used as a cement-based grout, e.g., a tile grout.

In some embodiments, water is present in the tinted cement-based grout paste in an amount of at least about 15% by weight, from about 20% by weight to about 30% by weight, or even to about 25% by weight, based on the weight of the cement-based powder component.

The tinted cement-based grout can be prepared according to any known method of making a grout so long as the water and the cement-based composition can be mixed uniformly, and the particular methodology employed is not critical. For example, water and the cement-based composition (a mixture of the powder component and the pigment component) can simply be placed in an appropriate container in appropriate amounts according to the product specification at the job site and mixed until a substantially uniform or consistent tinted grout is obtained.

The cement-based grout can be used for grouting tile joints.

In one embodiment, a method of grouting file joints includes mixing the cement-based powder component with a pigment (or a pigment component) and water to produce a tinted grout paste, applying the tinted grout paste to the joint, and allowing the tinted grout to cure.

The invention will be described further by way of the following examples. All parts, ratios, percentages, and amounts stated in the examples are by weight unless otherwise specified.

EXAMPLES

Test Methods:
Color Measurement Method

The color of a sample is measured using a SPECTRAFLASH 600 Plus spectrophotometer (Datacolor International (Lawrenceville, N.J.)), and is reported as "color tolerance value" according to the CIELAB color scale (CIE stands for Commission Internationale de l'Eclairage, translated as International Commission on Illumination) used by the spectrophotometer.

When a color is expressed in CIELAB (L*a*b*), L* defines lightness, a* denotes the red/green value and b* the yellow/blue value.

DL is the difference in the L* value, in terms of the lightness/darkness axis, relative to the L* value obtained for a sample that serves as a standard, where a positive value means lighter and a negative value means darker.

Da is the difference in the a* value, as determined on the red/green axis, relative to the a* value obtained for a sample that serves as a standard, where a positive value means redder and a negative value means greener.

Db is the difference in the b* value, as determined on the yellow/blue axis, relative to the b* value obtained for a sample that serves as a standard, where a positive value means yellower and a negative value means bluer.

Tile Absorption Test Method I

Samples are prepared according to Sample Preparation Method II for Color Measurement using ceramic wall tiles exhibiting at least 7% water absorption and porcelain tiles having less than 0.5% water absorption and then, about 24 hours after cure, the color tolerance values of the samples were measured according to the Color Measurement Method.

Tile Absorption Test Method II

Tile Absorption Test Method II is the same as Tile Absorption Test Method I with the exception that the samples are prepared according to Sample Preparation Method III, instead of Sample Preparation Method II.

Water Soak Test Method I

Samples are prepared according to Sample Preparation Method II for Color Measurement. After one day of cure, the samples are soaked in water until the grout is saturated (e.g., for about 5 minutes). The samples are then allowed to dry for one day. The dried samples are then measured according to the Color Measurement Method to obtain their color tolerance values. For each formulation, the ceramic tile sample is the standard and the porcelain tile sample is the comparative. DL, Da and Db values are determined by calculating the difference in the color tolerance values obtained for the comparative sample (i.e., the porcelain tile sample) relative to the values obtained for the standard sample (i.e., ceramic tile sample).

Water Soak Test Method II

Water Soak Test Method II is the same as Water Soak Test Method I with the exception that the samples are prepared according to Sample Preparation Method III, instead of Sample Preparation Method II.

Humidity Test Method I

Samples are prepared according Sample Preparation Method II for Color Measurement with the following exceptions: all of the tiles are ceramic tile, a first set of samples (i.e., the standard samples) is allowed to cure at room temperature (i.e., 70° F.+/−3° F.) in a 50% relative humidity (RH) environment for a period of one day, and a second set of samples (i.e., the comparative samples) made from the same grout formulation as the first set of samples is allowed to cure in a high humidity (100% RH) environment at room temperature for a period of one day. Samples are then measured according to the Color Measurement Method to obtain their color tolerance values and DL, Da and Db values are determined by calculating the difference in the color tolerance values obtained for the comparative sample (i.e., the 100% RH sample) relative to the values obtained for the standard sample (i.e., the 50% RH sample).

Humidity Test Method II

Humidity Test Method II is the same as Humidity Test Method I with the exception that the samples are prepared according to Sample Preparation Method III, instead of Sample Preparation Method II.

Water Content Test Method I

Two sets of samples are prepared according to Sample Preparation Method I for Color Measurement with the exception that, for a first set of samples (i.e., the standard samples), the amount of water added to the mixture of the cement-based powder component and pigment component is 21% by weight to achieve a grout paste with 21% by weight water, and for a second set of samples (i.e., the comparative sample) the amount of water added to the mixture of the cement-based powder component and pigment component is 25% by weight water to achieve a grout paste with 25% by weight water.

Samples are then measured according to the Color Measurement Test Method to obtain color tolerance values and DL, Da and Db values are determined by calculating the difference in the color tolerance values obtained for the comparative sample (i.e., the 25% by weight water sample) relative to the values obtained for the standard sample (i.e., the 21% by weight water sample).

Water Content Test Method II

Water Content Test Method II is the same as Water Content Test Method I with the exception that the samples are prepared according to Sample Preparation Method IV, instead of Sample Preparation Method II.

Water Droplet Test Method I

Samples are prepared according to Sample Preparation Method II for Color Measurement Samples with the exception that all of the tiles are ceramic. Then 20 drops of water are applied to the grout surface with a dropper. The water drops are allowed to evaporate and the surface is allowed to dry completely for about 24 hours prior to the color measurement. The samples are then measured according to the Color Measurement Method to obtain their color tolerance values. For each formulation, a sample that has not been exposed to the 20 drops of water is the standard and the sample that has been exposed to the 20 drops of water is the comparative. DL, Da and Db values are determined by calculating the difference in the color tolerance values obtained for the comparative sample (i.e., the 20 drops of water sample) relative to the values obtained for the standard sample.

Water Droplet Test Method II

Water Droplet Test Method II is Water Droplet Test Method I with the exception that the samples are prepared according to Sample Preparation Method III, instead of Sample Preparation Method II.

Sample Preparation Method I for Color Measurement

Samples of tinted cement-based grouts for color measurement are prepared by mixing a cement-based powder component, a pigment component, and water according to the manufacturer's water requirement specification to form a grout paste. The mixture is mixed for two minutes after the water is added. A small plastic cup (approx. ½ oz.) is then filled with the grout paste and an excess amount of the grout paste is allowed to remain above the top edge of the cup. After the grout reaches an initial set (the "initial set" is determined according ASTM C-266-08 Standard Test Method for Time of Setting of Hydraulic-Cement Paste by Gillmore Needles), the excess of the grout paste is scraped off with a metal straight edge until the surface of the grout paste is flush with the top of the cup. The samples are allowed to cure for about 24 hours.

Sample Preparation II for Color Measurement

Samples of a tinted cement-based grout for color measurement are prepared by mixing a cement-based powder component, a pigment component, and water according to the manufacturer's water requirement specification to form a grout paste. The mixture is mixed for two minutes after the water is added. The grout paste is then spread on the back of a 2⅛ inch×4½ inch size ceramic tile and the back of a 2⅛ inch×4½ inch size porcelain tile. The grout paste is applied to the back of the tile and a straight edge is used to spread the grout across the length of the tile. The amount of the grout paste applied to the back of each tile is kept constant by using a jig to hold each the tile in place. The height of the jig determines the thickness of the applied grout. The samples are allowed to cure for about 24 hours.

Sample Preparation Method III

A sample is prepared by combining, with mixing, a tintable cement-based grout composition, pigment in an amount sufficient to obtain a grout paste exhibiting a PANTONE COLOR NUMBER 16-1120 tint, and water to form a grout paste. The amounts of tintable cement-based grout composition and water and the mixing duration are in accordance with the manufacturer's specifications.

The grout paste is then spread on the back of a 2⅛ inch×4½ inch size ceramic tile and the back of a 2⅛ inch×4½ inch size porcelain tile. The grout paste is applied to the back of the tile and a straight edge is used to spread the grout across the length of the tile. The amount of the grout paste applied to the back of each tile is kept constant by using a jig to hold each the tile in place. The height of the jig determines the thickness of the applied grout. The samples are allowed to cure for about 24 hours.

Sample Preparation Method IV

A sample is prepared by combining, with mixing, a tintable cement-based grout composition, pigment in an amount sufficient to obtain a grout paste exhibiting a PANTONE COLOR NUMBER 16-1120 tint, and water to form a grout paste. The amounts of tintable cement-based grout composition and water and the mixing duration are in accordance with the manufacturer's specifications.

A small plastic cup (approx. ½ oz.) is then filled with the grout paste and an excess amount of the grout paste is allowed to remain above the top edge of the cup. After the grout reaches an initial set (the "initial set" is determined according ASTM C-266-08 Standard Test Method for Time of Setting of Hydraulic-Cement Paste by Gillmore Needles), the excess of the grout paste is scraped off with a metal straight edge until the surface of the grout paste is flush with the top of the cup. The samples are allowed to cure for about 24 hours.

EXAMPLES

Preparation 1

A tintable cement-based powder composition is prepared by mixing all the ingredients according to Table 1 in a Hobart mixer for approximately 6 minutes until uniformly mixed.

TABLE 1

| Ingredients | wt % |
| --- | --- |
| GROUT SPECIAL SILICA (sand) | 49.4 |
| PORTLAND CEMENT I WHITE | 23 |
| MARBLE WHITE 200 (calcium carbonate) | 25 |
| AXILAT SA 502 (Al2O3) | 0.5 |

TABLE 1-continued

| Ingredients | wt % |
| --- | --- |
| USG NO. 1 MOULDING PLASTER | 1.5 |
| PANGEL B-20 (Sepiolite clay) | 0.2 |
| NATROSOL 250HR (cellulose) | 0.05 |
| CREATECH TC 200 (cellulose fibers) | 0.1 |
| ELOTEX FX2311 (polymer) | 0.25 |
| Total | 100 |

Example 1 Tinted Grout 1 (TG-1)

A tinted cement-based grout (TG-1) was prepared by mixing 12.5 lb of the cement-based powder component of Preparation 1 with a mixture of 0.0287 lb black iron oxide pigment, 0.04015 lb yellow iron oxide pigment, and 0.0067 lb red iron oxide pigment, and 2.875 lb water. The resulting tinted grout exhibited a uniform and consistent light buff-color.

Example 2 Tinted Grout 2 (TG-2)

A tinted cement-based grout (TG-2) was prepared by mixing 12.5 lb of the cement based powder composition of Preparation 1 with a mixture of 0.102 lb black iron oxide pigment, 0.054 lb yellow iron oxide pigment, and 0.018 lb red iron oxide pigment, and 2.875 lb water. The resulting tinted grout exhibited a uniform and consistent summer wheat color.

Example 3 Tinted Grout 3 (TG-3)

A tinted cement-based grout (TG-3) was prepared by mixing 12.5 lb of the cement based powder composition of Preparation 1 with a mixture of 0.1488 lb black iron oxide pigment, 0.072 lb yellow iron oxide pigment, and 0.0192 lb red iron pigment, and 2.875 lb water. The resulting tinted grout exhibited a uniform and consistent dark walnut color.

Control 1

The grout paste designated "TG-1 less 3 ingredients" was prepared according to the method of preparing the grout paste of Example 1 with the exception that calcium sulfate hemi-hydrate, aluminum oxide and Sepiolite clay were omitted from the composition.

Control 2

The grout paste designated "TG-2 less 3 ingredients" was prepared according to the method of preparing the grout paste of Example 2 with the exception that calcium sulfate hemi-hydrate, aluminum oxide and Sepiolite clay were omitted from the composition.

Control 3

The grout paste designated "TG-3 less 3 ingredients" was prepared according to the method of preparing the grout paste of Example 3 with the exception that calcium sulfate hemi-hydrate, aluminum oxide and Sepiolite clay were omitted from the composition.

Comparative Grout Compositions

The comparative grout compositions were as follows:

TEC Accucolor Sanded Grout Summer Wheat from HB Fuller, (St. Paul, Minn.),

TEC Accucolor Light Buff from HB Fuller,

Custom Polyblend Light Smoke from Custom Building Products (Seal Beach, Calif.), Custom Polyblend Sable Brown from Custom Building Products, Laticrete 1500 Mocha from Laticrete International (Bethany, Conn.), Laticrete 1500 Parchment from Laticrete International, Mapei Keracolor S Chamois from Mapei (Deerfield Beach, Fla.), Mapei Keracolor S Cocoa from Mapei.

When the above comparative grout compositions were used in the tests below, the compositions were prepared as grout pastes according to the manufacturer's specifications.

Test #1

Tinted grout formulations of Examples 1 and 2 (TG-1 and TG-2) were used as standards to compare their color to that of the same formulations without three ingredients (i.e., calcium sulfate hemi-hydrate, aluminum oxide and Sepiolite clay) (Controls 1 and 2). Their color tolerance values were measured according to the Color Measurement Method after the samples had cured for about 24 hours. The results are reported in Table 2.

The colors of the samples without the three ingredients (i.e., the control formulations) were significantly lighter than those of the standards.

TABLE 2

| Test # 1 | Standard | Control Formulation | DL | Da | Db |
|---|---|---|---|---|---|
| | TG 1 | TG1 less 3 ingredients | 3.77 | 0.02 | 0.11 |
| | TG 2 | TG2 less 3 ingredients | 3.28 | −0.04 | −0.33 |

Test #2.

A Control Formulation was prepared according to Example 2 (TG-2), except that three ingredients (i.e., calcium sulfate hemi-hydrate, aluminum oxide & Sepiolite clay) were omitted from the formulation, and a mixture of 0.1734 lb black iron oxide pigment, 0.0918 lb yellow iron oxide pigment, and 0.0342 lb red iron pigment was used in place of the pigments mentioned in Example 2. The color tolerance values of the Standard and Control Formulation were measured according to the Color Measurement Method after the samples had cured for about 24 hours. The results are reported in Table 3.

Additional amounts of pigments were added to the formulation without the three ingredients (i.e., the Control Formulation) to determine the amount of additional pigment that was needed to obtain the same color as the grout of Example 2. The amount of pigment necessary does vary with the color of the grout. Darker colors require more additional pigment and lighter colors require less additional pigment. For the darker colors, the result shows that 70% additional pigment is required to obtain the same color as that of the tinted grout formulation of Example 2.

TABLE 3

| Test # 2 | Standard | Control Formulation | DL | Da | Db |
|---|---|---|---|---|---|
| | TG-2 | TG-2 less 3 ingredients plus 70% additional pigments | 0.34 | −0.04 | −0.82 |

Test #3.

Test samples were prepared according to Sample Preparation Method I for Color Measurement with the exception that the grout pastes were prepared according to the method of Example 3 (i.e., TG-3) with the further exception that three ingredients (i.e., calcium sulfate hemi-hydrate, aluminum oxide and Sepiolite clay) were omitted from the composition of Example 3 (i.e., TG-3) one by one and then in groups of two.

After the samples had cured for about 24 hours, their color tolerance values were measured according to the Color Measurement Method. The altered formulations (Control Formulations) were read against the tinted grout of Example 3 (TG-3) (the Standard). The results are reported in Table 4. The results show that omitting the calcium sulfate hemi-hydrate and/or Sepiolite clay from the composition lightens the color. Omitting aluminum oxide darkens the color slightly.

TABLE 4

| Test # 3 | Standard | Control Formulations | DL | Da | Db |
|---|---|---|---|---|---|
| | TG-3 | TG-3 less clay | 1.23 | 0.05 | −0.21 |
| | TG-3 | TG-3 less calcium sulfate hemi-hydrate | 4.12 | −0.03 | 0.2 |
| | TG-3 | TG-3 less Al$_2$O$_3$ | −0.7 | −0.03 | −0.01 |
| | TG-3 | TG-3 less clay and calcium sulfate hemi-hydrate | 4.97 | −0.23 | −0.55 |
| | TG-3 | TG-3 less Al$_2$O$_3$ and clay | 1.54 | −0.21 | −0.66 |
| | TG-3 | TG-3 less Al$_2$O$_3$ and calcium sulfate hemi-hydrate | 2.71 | −0.18 | −0.57 |

Test #4.

All the testing samples were prepared according to the Sample Preparation Method II for Color measurement with the exception that the grout pastes used in samples TG-2, TG-2 less 3 ingredients, TG-3, and TG-3 less 3 ingredients were prepared according to Example 2, Control 2, Example 3 and Control 3, respectively. After the samples had cured for about 24 hours their color tolerance values were measured according to the Color Measurement Method. The results are reported in Table 5.

Different types of tiles used in the installation can further lead to color inconsistency. For example, bisque wall tiles are often installed on a wall, while porcelain tiles are used on the floor. Bisque wall tiles have a water absorption of 7%, while porcelain tiles have less than 0.5% water absorption. Due to the difference in water absorbed from the grout, the color will be lighter for a porcelain tile versus a more absorptive tile e.g., ceramic tile.

TABLE 5

| Test # 4 | Standard (Ceramic Tile) | Comparative Formulation (Porcelain Tile) | DL | Da | Db |
|---|---|---|---|---|---|
| | TG-2 | TG-2 | 2.63 | 0.23 | 0.28 |
| | TG-2 less 3 ingredients | TG-2 less 3 ingredients | 4.16 | 0.14 | 0.06 |
| | TG-3 | TG-3 | 2.91 | 0.18 | −0.12 |
| | TG-3 less 3 ingredients | TG-3 less 3 ingredients | 3.68 | 0.08 | −0.31 |
| | TEC Accucolor Sanded Grout Summer Wheat | TEC Accucolor Sanded Grout Summer Wheat | 5.49 | 0.46 | 0.68 |
| | Custom Polyblend Sable Brown | Custom Polyblend Sable Brown | 6.4 | 0.48 | −0.94 |
| | Custom Polyblend Light Smoke | Custom Polyblend Light Smoke | 10.72 | −0.57 | −1.2 |
| | Laticrete 1500 Parchment | Laticrete 1500 Parchment | 5.82 | −0.9 | −1.7 |
| | Mapei Keracolor S Chamois | Mapei Keracolor S Chamois | 4.18 | −0.93 | −1.5 |
| | Mapei Keracolor S Cocoa | Mapei Keracolor S Cocoa | 5.94 | −0.77 | −2.06 |

Test #5

All the testing samples were prepared and tested according to Tile Absorption Test Method I with the following exceptions: 1) the grout pastes were prepared according to Example 3, and 2) calcium sulfate hemi-hydrate, Sepiolite clay or aluminum oxide was replaced with a different material as indicated in Table 6. The results are reported in Table 6.

The results show the differences in color tolerance values when calcium sulfate hemi-hydrate, Sepiolite clay or aluminum oxide is replaced with different materials as determined using tiles having different water absorption percentages.

TABLE 6

| Test Standard #5 (Ceramic Tile) | Comparative Formulation (Porcelain Tile) | DL | Da | Db |
|---|---|---|---|---|
| TG-3 | TG-3 | 2.91 | 0.18 | −0.12 |
| calcium aluminate cement replacing aluminum oxide | calcium aluminate cement replacing aluminum oxide | 4.47 | 0.31 | 0.42 |
| anhydrite gypsum replacing Plaster | anhydrite gypsum replacing Plaster | 5.23 | 0.38 | 0.51 |
| dihydrate gypsum replacing Plaster | dihydrate gypsum replacing Plaster | 3.98 | 0.15 | −0.21 |
| Attapulgite clay replacing Sepiolite clay | Attapulgite clay replacing Sepiolite clay | 5.08 | 0.29 | 0.28 |
| Kaolin clay replacing Sepiolite clay | Kaolin clay replacing Sepiolite clay | 5.87 | 0.47 | 0.72 |
| Metakaolin clay replacing Sepiolite clay | Metakaolin clay replacing Sepiolite clay | 6.66 | 0.49 | 0.78 |
| Bentonite clay replacing Sepiolite clay | Bentonite clay replacing Sepiolite clay | 3.32 | 0.1 | −0.22 |
| Phyllosilicate clay replacing Sepiolite clay | Phyllosilicate clay replacing Sepiolite clay | 6.62 | 0.18 | 0.2 |

Test #6.

All the testing samples were prepared and tested according to Water Soak Test Method I with the exception that the grout pastes used in samples TG-2 and TG-2 less 3 ingredients were prepared according to Example 2 and Control 2, respectively. The samples were allowed to dry for one day, and then their color tolerance values were measured according to the Color Measurement Method. The results are reported in Table 7.

The results (i.e., the differences in the L color value (i.e., DL) obtained for the ceramic tile versus the porcelain tile) show that the differences outlined in Test #4 are even more exaggerated with dramatic difference after the grout was subjected to water exposure.

TABLE 7

| Test Standard #6 (Ceramic Tile) | Comparative Formulation (Porcelain Tile) | DL | Da | Db |
|---|---|---|---|---|
| TG-2 | TG-2 | 2.95 | 0.55 | 1.2 |
| TG-2 less 3 ingredients | TG-2 less 3 ingredients | 6.76 | 0.37 | 0.8 |
| TEC Accucolor Sanded Grout Summer Wheat | TEC Accucolor Sanded Grout Summer Wheat | 9.82 | 0.44 | 0.42 |
| TEC Accucolor Light Buff | TEC Accucolor Light Buff | 6.51 | −0.78 | −1.66 |
| Custom Polyblend Light, Smoke | Custom Polyblend Light, Smoke | 9.66 | −0.27 | 0.62 |
| Custom Polyblend Sable Brown | Custom Polyblend Sable Brown | 8.31 | −0.44 | −0.86 |
| Mapei Keracolor S Cocoa | Mapei Keracolor S Cocoa | 8.04 | −0.59 | −1.19 |

TABLE 7-continued

| Test Standard #6 (Ceramic Tile) | Comparative Formulation (Porcelain Tile) | DL | Da | Db |
|---|---|---|---|---|
| Mapei Keracolor S Chamois | Mapei Keracolor S Chamois | 11.91 | −2.18 | −3.58 |
| Laticrete 1500 Mocha | Laticrete 1500 Mocha | 9.87 | 0.46 | 1.57 |
| Laticrete 1500 Parchment | Laticrete 1500 Parchment | 15.09 | −1.28 | −1.01 |

Test #7.

All the testing samples were prepared and tested according to the Humidity Test Method with the exception that the grout pastes used in the samples identified as TG-1, TG-2, and TG-2 less 3 ingredients were prepared according to Examples 1 and 2 and Control 2. The results reported in Table 8 show the difference in the L color value obtained for the grout cured at 100% relative humidity (i.e., the Comparative) relative to the grout cured at 50% relative humidity (i.e., the Standard) and the effect of the environmental conditions on the color consistency of samples. The results are reported in Table 8.

TABLE 8

| Test Standard (Cured #7 at 50% RH) | Comparative (Cured at 100% RH) | DL | Da | Db |
|---|---|---|---|---|
| TG-2 | TG-2 | −2.01 | −0.37 | −0.56 |
| TG-1 | TG-1 | −1.39 | 0.27 | 0.51 |
| TG-2 less 3 ingredients | TG-2 less 3 ingredients | 0.27 | −0.11 | −0.23 |
| TEC Accucolor Sanded Grout Summer Wheat | TEC Accucolor Sanded Grout Summer Wheat | 5.71 | 0.06 | 1.73 |
| TEC Accucolor Light Buff | TEC Accucolor Light Buff | 3.16 | −0.36 | −0.83 |
| Custom Polyblend Light Smoke | Custom Polyblend Light Smoke | 3.59 | −0.49 | −1.59 |
| Mapei Keracolor S Cocoa | Mapei Keracolor S Cocoa | 0.83 | 0.15 | 0.11 |
| Laticrete 1500 Mocha | Laticrete 1500 Mocha | 5.82 | 0.03 | 0.15 |
| Laticrete 1500 Parchment | Laticrete 1500 Parchment | 4.73 | −0.96 | −2.23 |

Test #8.

Test samples were prepared and tested according to Water Content Test Method I. The results are reported in Table 9.

The color tolerance values of the sample at the high end of the water demand (i.e., the Comparative sample) was read against (i.e., compared to) the color tolerance values of the sample at the low end of the water demand (i.e., the Standard sample).

The results show that the samples of the tintable grout of Example TG-1 showed very little difference in the L color value (i.e., a relatively small DL), whereas the samples of the comparative formulations (i.e., TG-1 formula without calcium sulfate hemi-hydrate, aluminum oxide and Sepiolite clay) showed a very large difference in the L color value (i.e., a relatively large DL value).

TABLE 9

| Test # 8 | Standard (mixed at 21% water) | Comparative (mixed at 25% water) | DL | Da | Db |
|---|---|---|---|---|---|
| | TG-1 | TG-1 | 0.13 | −0.48 | −0.92 |
| | TG-1 less 3 ingredients | TG-1 less 3 ingredients | 3.93 | 0.26 | 1.12 |

Test #9 Efflorescence Evaluation

Test samples were prepared and tested according the Water Droplet Test Method I with the exception that the grout pastes used in samples TG-1 and TG-2 were prepared according to Examples 1 and 2, respectively. The results are reported in Table 10.

TABLE 10

| Test # 9 | Standard | Comparative | DL | Da | Db |
|---|---|---|---|---|---|
| | TG-2 | TG-2 | −0.11 | 0.02 | 0.18 |
| | TG-1 | TG-1 | −1.17 | 0.02 | −0.03 |
| | Custom Polyblend Sable Brown | Custom Polyblend Sable Brown | 4.28 | −0.32 | −1.06 |
| | Custom Polyblend Light Smoke | Custom Polyblend Light Smoke | 3.74 | −1.3 | −3.5 |
| | Mapei Keracolor S Chamois | Mapei Keracolor S Chamois | 3.34 | −2.4 | −7.52 |
| | Mapei Keracolor S Cocoa | Mapei Keracolor S Cocoa | 5.98 | −1.78 | −3.88 |

Other embodiments are within the claims. Although the tintable cement-based powder has been described as including calcium sulfate hemihydrate, aluminum oxide, and Sepiolite clay, the pigment component additionally or alternatively can include at least one of these components. Useful pigment components optionally include from about 50% by weight to about 75% by weight or even from about 55% by weight to about 70% by weight calcium sulfate hemihydrate, from about 15% by weight to about 30% by weight, or even from about 17% by weight to about 25% by weight aluminum oxide, and from about 4% by weight to about 15% by weight, or even from 5% by weight to about 12% by weight Sepiolite clay.

The embodiments of the invention described above are not intended to be exhaustive or to limit the invention to the particular embodiments disclosed in the following detailed description. Rather, the embodiments are described so that others skilled in the art can understand the principles and practices of the invention. Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

We claim:

1. A cement-based composition comprising:
a cement-based powder component comprising Portland cement, filler, calcium sulfate hemihydrate, aluminum oxide, and Sepiolite clay; and
a pigment component comprising at least one pigment;
the cement-based composition exhibiting color tolerance values of DL=0+/−3.0, Da=0+/−1.5, and Db=0+/−1.5 when tested according to at least one of Water Content Test Method I and Water Soak Test Method I.

2. The cement-based composition of claim 1, wherein the composition exhibits color tolerance values of DL=0+/−3.0, Da=0+/−1.5, and Db=0+/−1.5 when tested according to the Water Content Test Method I.

3. The cement-based composition of claim 1, wherein the composition exhibits color tolerance values of DL=0+/−3.0, Da=0+/−1.5, and Db=0+/−1.5 when tested according to the Water Soak Test Method I.

4. The cement-based composition of claim 1, wherein the cement-based powder component comprises from about 15% by weight to about 50% by weight Portland cement.

5. The cement-based composition of claim 1, wherein the cement-based powder component comprises from about 30% by weight to about 70% by weight filler.

6. The cement-based composition of claim 1, wherein the cement-based powder component comprises from about 0.1% by weight to about 10% by weight calcium sulfate hemi-hydrate.

7. The cement-based composition of claim 1, wherein the cement-based powder component comprises from about 0.1% by weight to about 5% by weight aluminum oxide.

8. The cement-based composition of claim 1, wherein the cement-based powder component comprises from about 0.05% by weight to about 3% by weight Sepiolite clay.

9. The cement-based composition of claim 1, wherein the filler is selected from the group consisting of silica sand, calcium carbonate, and combination thereof.

10. The cement-based composition of claim 1, wherein the pigment component comprises a mixture of at least two different pigments.

11. A tintable cement-based powder comprising:
Portland cement;
filler;
calcium sulfate hemi-hydrate;
aluminum oxide; and
Sepiolite clay.

12. The tintable cement-based powder of claim 11, comprising:
from about 0.1% by weight to about 10% by weight calcium sulfate hemi-hydrate;
from about 0.1% by weight to about 5% by weight aluminum oxide; and
from 0.05% by weight to about 3% by weight Sepiolite clay.

13. The tintable cement-based powder of claim 11, comprising:
from about 0.1% by weight to about 5% by weight calcium sulfate hemi-hydrate;
from about 0.1% by weight to about 3% by weight aluminum oxide; and
from 0.05% by weight to about 2% by weight Sepiolite clay.

14. The tintable cement-based powder of claim 11, comprising:
from 0.5% by weight to about 2.5% by weight calcium sulfate hemi-hydrate;
from 0.3% by weight to about 2% by weight aluminum oxide; and
from 0.1% by weight to about 1% by weight Sepiolite clay.

15. The tintable cement-based powder of claim 11, wherein the tintable cement-based powder exhibits color tolerance values of DL=0+/−3.0, Da=0+/−1.5, and Db=0+/−1.5 when tested according to at least one of Water Soak Test Method II, Water Content Test Method II, Water Absorption Test Method II and Water Droplet Test Method II.

16. The tintable cement-based powder of claim 11, wherein the tintable cement-based powder exhibits color tolerance values of DL=0+/−3.0, Da=0+/−1.5, and Db=0+/−

1.5 when tested according to Water Droplet Test Method II, Water Content Test Method II, and Water Soak Test Method II.

17. The tintable cement-based powder of claim 11, wherein the tintable cement-based powder exhibits color tolerance values of DL=0+/−3.0, Da=0+/−1.5, and Db=0+/−1.5 when tested according to Water Content Test Method II and Water Soak Test Method II.

18. The tintable cement-based powder of claim 11, wherein the filler is selected from the group consisting of silica sand, calcium carbonate, and combinations thereof.

19. A tinted cement-based composition comprising:
the tintable cement-based powder of claim 11; and
from 0.1% by weight to no greater than 10% by weight pigment.

20. A method for grouting a tile joint, the method comprising
combining the cement-based composition of claim 1 and water to produce a tinted grout paste;
applying the tinted grout paste to the joint; and
allowing the tinted grout to cure.

21. The method of claim 20, wherein the combining comprises combing the tintable cement-based composition with from about 15% by weight to about 30% by weight water based on the weight of the powder.

22. A method for tinting and grouting a tile joint, the method comprising:
mixing the tintable cement-based powder of claim 11 with a pigment and water to produce a tinted grout paste;
applying the tinted grout paste to the joint; and
allowing the tinted grout to cure.

23. A kit for providing a tinted grout comprising:
the cement-based composition of claim 1; and
instructions for mixing the powder component, the pigment, and water to provide a tinted grout.

24. A kit for providing a tinted grout comprising:
the tintable cement-based powder of claim 11; and
instructions for mixing the tintable cement-based powder with at least one pigment and water to provide a tinted grout.

25. The cement-based composition of claim 1, comprising:
from about 0.1% by weight to about 10% by weight calcium sulfate hemi-hydrate;
from about 0.1% by weight to about 5% by weight aluminum oxide; and
from 0.05% by weight to about 3% by weight Sepiolite clay.

26. The cement-based composition of claim 1, comprising:
from about 0.1% by weight to about 5% by weight calcium sulfate hemi-hydrate;
from about 0.1% by weight to about 3% by weight aluminum oxide; and
from 0.05% by weight to about 2% by weight Sepiolite clay.

27. The cement-based composition of claim 1, comprising:
from 0.5% by weight to about 2.5% by weight calcium sulfate hemi-hydrate;
from 0.3% by weight to about 2% by weight aluminum oxide; and
from 0.1% by weight to about 1% by weight Sepiolite clay.

* * * * *

UNITED STATES PATENT AND TRADEMARK OFFICE
CERTIFICATE OF CORRECTION

| | | |
|---|---|---|
| PATENT NO. | : 10,472,279 B1 | Page 1 of 1 |
| APPLICATION NO. | : 14/608773 | |
| DATED | : November 12, 2019 | |
| INVENTOR(S) | : Miller et al. | |

It is certified that error appears in the above-identified patent and that said Letters Patent is hereby corrected as shown below:

On the Title Page

Item (73) (A) Name of Assignee and (B) RESIDENCE should be corrected to read:
H.B. Fuller Construction Products, Inc.
St. Paul, MN USA Signed and Sealed this
Twenty-first Day of April, 2020

Andrei Iancu
*Director of the United States Patent and Trademark Office*